US012645742B1

(12) United States Patent
Schuhl et al.

(10) Patent No.: US 12,645,742 B1
(45) Date of Patent: Jun. 2, 2026

(54) SYSTEM, METHOD, AND COMPUTER PROGRAM PRODUCT FOR RETRIEVAL-AUGMENTED GENERATION-BASED PRODUCT ASSISTANT

(71) Applicant: Mistral AI, Paris (FR)

(72) Inventors: Nicolas Schuhl, Paris (FR); Mathis Grosmaitre, Paris (FR); Paul Devillers, Paris (FR)

(73) Assignee: Mistral AI, Paris (FR)

( * ) Notice: Subject to any disclaimer, the term of this patent is extended or adjusted under 35 U.S.C. 154(b) by 0 days.

(21) Appl. No.: 19/439,595

(22) Filed: Jan. 5, 2026

(51) Int. Cl.
*G06F 16/90* (2019.01)
*G06F 16/906* (2019.01)
*G06F 16/93* (2019.01)
G06F 16/334 (2025.01)

(52) U.S. Cl.
CPC ............ *G06F 16/93* (2019.01); *G06F 16/906* (2019.01); *G06F 16/3347* (2019.01)

(58) Field of Classification Search
CPC ..... G06F 16/93; G06F 16/906; G06F 16/3347
See application file for complete search history.

(56) References Cited

U.S. PATENT DOCUMENTS

| | | | | |
|---|---|---|---|---|
| 2017/0162191 | A1* | 6/2017 | Grost ................... | G10L 15/075 |
| 2020/0216089 | A1* | 7/2020 | Garcia ............. | G06F 16/90332 |
| 2024/0419710 | A1* | 12/2024 | Matson .................... | G06N 3/08 |
| 2025/0013683 | A1* | 1/2025 | Granieri ................ | G06F 16/338 |
| 2025/0315496 | A1* | 10/2025 | Nagarajan ............. | G06V 30/10 |
| 2026/0030480 | A1* | 1/2026 | Gong .................... | G06N 3/045 |

FOREIGN PATENT DOCUMENTS

| | | | | |
|---|---|---|---|---|
| CN | 119829785 A | | 4/2025 | |
| CN | 120123468 A | | 6/2025 | |
| KR | 20250165795 A | * | 11/2025 | ........... G06F 16/538 |

OTHER PUBLICATIONS

Article entitled Intelligent Question Answering Module for Product Manuals, by Govindan et al., dated 2021 (Year: 2021).*
Machine Translation of KR20250165795A issued to Jung et al., Published on Nov. 27, 2025 (Year: 2025).*
Article entitled "When Silence is Safer: A Review of LLM Abstention in Healthcare", by Presacan et al., dated Dec. 15, 2025 (Year: 2025).*
Article entitled "CarExpert: Leveraging Large Language Models for In-Car Conversational Question Answering", by Rony et al., dated Dec. 10, 2023 (Year: 2023).*

(Continued)

*Primary Examiner* — Mahesh H Dwivedi
(74) *Attorney, Agent, or Firm* — The Webb Law Firm

(57) ABSTRACT
Provided are systems, methods, and computer program products for RAG-based product assistance. The system includes a computing device configured to receive a request through an interface of a product, automatically retrieve, based on the request, at least one data element from a data storage device, the at least one data element comprising first text including at least a portion of at least one text string generated from at least one image arranged in at least one document associated with the product, and second text including at least a portion of text from the at least one document, and generate a response to the request based on the at least one data element.

25 Claims, 5 Drawing Sheets

(56)              References Cited

OTHER PUBLICATIONS

Article entitled "IDAS: Intelligent Driving Assistance System Using RAG", by Hernandez-Salinas et al., dated Aug. 21, 2024 (Year: 2024).*
Article entitled "Volkswagen integrates Google's generative AI to enhance app experience", by Baar, dated Sep. 30, 2024 ( Year: 2024).*
Article entitled "Stellanti and Mistral Al Strengthen Strategic Partnership to Enhance Customer Experience, Vehicle Development and Manufacturing", by Stellantis, dated Feb. 7, 2025 (Year: 2025).*

* cited by examiner

SYSTEM, METHOD, AND COMPUTER PROGRAM PRODUCT FOR RETRIEVAL-AUGMENTED GENERATION-BASED PRODUCT ASSISTANT

BACKGROUND

1. Field

This disclosure relates generally to machine-learning and, in some non-limiting embodiments or aspects, systems, methods, and computer program products for real-time on-device product assistance with retrieval-augmented generation (RAG).

2. Technical Considerations

Existing solutions for RAG to provide automated product-based assistance involve multiple overlapping microservices and serial large language model (LLM) calls that cause high latency, compounded by the challenges of real-time processing, due to limited on-device computing power, inaccuracies, and inefficient out-of-domain handling (e.g., an inability to distinguish between different types of queries or intent), leading to hallucinations or erratic behavior. Such hallucinations are of a particular concern for products that may cause injury, such as vehicles, industrial systems, home appliances, and/or the like.

SUMMARY

According to non-limiting embodiments or aspects, provided is a method comprising: receiving a request through an interface of a product; automatically retrieving, with at least one computing device and based on the request, at least one data element from a data storage device, the at least one data element comprising first text including at least a portion of at least one text string generated from at least one image arranged in at least one document associated with the product, and second text including at least a portion of text from the at least one document; and generating, with at least one computing device, a response to the request based on the at least one data element.

In non-limiting embodiments or aspects, the product comprises at least one of the following: home appliances, industrial equipment, medical devices, mechanical systems, robotic systems, in-vehicle systems, or any combination thereof. In non-limiting embodiments or aspects, the at least one document comprises a manual for the product, and the at least one image comprises a diagram of at least a portion of the product. In non-limiting embodiments or aspects, the method includes: generating a plurality of embeddings based on the text and the at least one text string, the plurality of embeddings are stored in the at least one data storage device in association with the text and the at least one text string; in response to receiving the request, generating at least one embedding based on the request; and searching the plurality of embeddings based on the at least one embedding to identify the at least one data element. In non-limiting embodiments or aspects, the method includes: in response to receiving the request, classifying the request based on a plurality of categories, the at least one data element is retrieved from the data storage device in response to the request being classified as a first category of the plurality of categories.

In non-limiting embodiments or aspects, the product comprises a vehicle, the method includes: receiving a second request through the vehicle; in response to receiving the second request, classifying the second request based on a plurality of categories comprising at least a product manual category and a navigation category; in response to classifying the second request as a navigation request, extracting navigation parameters from the second request; generating a navigation message based on the navigation parameters; and communicating the navigation message to a navigation system arranged onboard the vehicle. In non-limiting embodiments or aspects, the method includes: receiving a second request through the product; in response to receiving the second request, classifying the second request based on a plurality of categories comprising at least a product manual category and a product system category; in response to classifying the second request as a product system request, extracting product system parameters from the second request; generating a product system message based on the product system parameters; and communicating the product system message to a control system for the product.

In non-limiting embodiments or aspects, wherein generating the response to the request comprises: determining the at least one data element is missing context, the response comprising a refusal message. In non-limiting embodiments or aspects, wherein generating the response to the request further comprises: generating an inference request based on the request and the at least one data element; inputting the inference request into a machine-learning model, resulting in an initial response; determining that a confidence score of the initial response does not satisfy a threshold; and in response to determining that the confidence score does not satisfy the threshold, generating the refusal message. In non-limiting embodiments or aspects, the method includes: extracting the at least one image from the at least one document; generating, with a machine-learning model, the at least one text string based on the at least one image; and storing, in the at least one data storage device, the at least one text string in association with the at least a portion of text from the at least one document. In non-limiting embodiments or aspects, wherein storing the at least one text string in association with the text of the at least one document comprises inserting the at least one text string into the text of the at least one document based on a position of the at least one image in the at least one document. In non-limiting embodiments or aspects, wherein extracting the at least one image from the at least one document comprises detecting the at least one image in the at least one document, and wherein generating the at least one text string comprises: applying optical character recognition to the at least one image to identify at least one text label string within the at least one image; and combining the at least one text string with the at least one text label string.

According to non-limiting embodiments or aspects, provided is a system comprising: at least one computing device configured to: receive a request through an interface of a product; automatically retrieve, based on the request, at least one data element from a data storage device, the at least one data element comprising first text including at least a portion of at least one text string generated from at least one image arranged in at least one document associated with the product, and second text including at least a portion of text from the at least one document; and generate a response to the request based on the at least one data element.

In non-limiting embodiments or aspects, the product comprises at least one of the following: home appliances, industrial equipment, medical devices, mechanical systems, robotic systems, in-vehicle systems, or any combination thereof. In non-limiting embodiments or aspects, the at least one document comprises a manual for the product, and the at least one image comprises a diagram of at least a portion of the product. In non-limiting embodiments or aspects, the at least one computing device is further configured to: generate a plurality of embeddings based on the text and the at least one text string, the plurality of embeddings are stored in the at least one data storage device in association with the text and the at least one text string; in response to receiving the request, generate at least one embedding based on the request; and search the plurality of embeddings based on the at least one embedding to identify the at least one data element. In non-limiting embodiments or aspects, the at least one computing device is further configured to: in response to receiving the request, classify the request based on a plurality of categories, the at least one data element is retrieved from the data storage device in response to the request being classified as a first category of the plurality of categories.

In non-limiting embodiments or aspects, the product comprises a vehicle, and the at least one computing device is further configured to: receive a second request through the vehicle; in response to receiving the second request, classify the second request based on a plurality of categories comprising at least a product manual category and a navigation category; in response to classifying the second request as a navigation request, extract navigation parameters from the second request; generate a navigation message based on the navigation parameters; and communicate the navigation message to a navigation system arranged onboard the vehicle. In non-limiting embodiments or aspects, the at least one computing device is further configured to: receive a second request through the product; in response to receiving the second request, classify the second request based on a plurality of categories comprising at least a product manual category and a product system category; in response to classifying the second request as a product system request, extract product system parameters from the second request; generate a product system message based on the product system parameters; and communicate the product system message to a control system for the product.

In non-limiting embodiments or aspects, wherein generating the response to the request comprises: determining the at least one data element is missing context, the response comprises a refusal message. In non-limiting embodiments or aspects, wherein generating the response to the request comprises: generating an inference request based on the request and the at least one data element; inputting the inference request into a machine-learning model, resulting in an initial response; determining that a confidence score of the initial response does not satisfy a threshold; and in response to determining that the confidence score does not satisfy the threshold, generating the refusal message. In non-limiting embodiments or aspects, the at least one computing device is further configured to: extract the at least one image from the at least one document; generate, with a machine-learning model, the at least one text string based on the at least one image; and store, in the at least one data storage device, the at least one text string in association with the at least a portion of text from the at least one document. In non-limiting embodiments or aspects, wherein storing the at least one text string in association with the text of the at least one document comprises inserting the at least one text string into the text of the at least one document based on a position of the at least one image in the at least one document. In non-limiting embodiments or aspects, wherein extracting the at least one image from the at least one document comprises detecting the at least one image in the at least one document, and wherein generating the at least one text string comprises: applying optical character recognition to the at least one image to identify at least one text label string within the at least one image; and combining the at least one text string with the at least one text label string.

According to non-limiting embodiments or aspects, provided is a computer program product comprising at least one non-transitory computer-readable medium including program instructions that, when executed by at least one computing device, cause the at least one computing device to: receive a request through an interface of a product; automatically retrieve, based on the request, at least one data element from a data storage device, the at least one data element comprising first text including at least a portion of at least one text string generated from at least one image arranged in at least one document associated with the product, and second text including at least a portion of text from the at least one document; and generate a response to the request based on the at least one data element.

Further non-limiting embodiments and aspects are provided in the following clauses:

Clause 1: A method comprising: receiving a request through an interface of a product; automatically retrieving, with at least one computing device and based on the request, at least one data element from a data storage device, the at least one data element comprising first text including at least a portion of at least one text string generated from at least one image arranged in at least one document associated with the product, and second text including at least a portion of text from the at least one document; and generating, with at least one computing device, a response to the request based on the at least one data element.

Clause 2: The method of clause 1, wherein the product comprises at least one of the following: home appliances, industrial equipment, medical devices, mechanical systems, robotic systems, in-vehicle systems, or any combination thereof.

Clause 3: The method of any of clauses 1-2, wherein the at least one document comprises a manual for the product, and wherein the at least one image comprises a diagram of at least a portion of the product.

Clause 4: The method of any of clauses 1-3, further comprising: generating a plurality of embeddings based on the text and the at least one text string, wherein the plurality of embeddings are stored in the at least one data storage device in association with the text and the at least one text string; in response to receiving the request, generating at least one embedding based on the request; and searching the plurality of embeddings based on the at least one embedding to identify the at least one data element.

Clause 5: The method of any of clauses 1-4, further comprising: in response to receiving the request, classifying the request based on a plurality of categories, wherein the at least one data element is retrieved from the data storage device in response to the request being classified as a first category of the plurality of categories.

Clause 6: The method of any of clauses 1-5, wherein the product comprises a vehicle, the method further comprising: receiving a second request through the vehicle; in response to receiving the second request, classifying the second request based on a plurality of categories comprising at least a product manual category and a navigation category; in response to classifying the second request as a navigation request, extracting navigation parameters from the second request; generating a navigation message based on the navigation parameters; and communicating the navigation message to a navigation system arranged onboard the vehicle.

Clause 7: The method of any of clauses 1-6, further comprising: receiving a second request through the product; in response to receiving the second request, classifying the second request based on a plurality of categories comprising at least a product manual category and a product system category; in response to classifying the second request as a product system request, extracting product system parameters from the second request; generating a product system message based on the product system parameters; and communicating the product system message to a control system for the product.

Clause 8: The method of any of clauses 1-7, wherein generating the response to the request comprises: determining the at least one data element is missing context, wherein the response comprises a refusal message.

Clause 9: The method of any of clauses 1-8, wherein generating the response to the request further comprises: generating an inference request based on the request and the at least one data element; inputting the inference request into a machine-learning model, resulting in an initial response; determining that a confidence score of the initial response does not satisfy a threshold; and in response to determining that the confidence score does not satisfy the threshold, generating the refusal message.

Clause 10: The method of any of clauses 1-9, further comprising: extracting the at least one image from the at least one document; generating, with a machine-learning model, the at least one text string based on the at least one image; and storing, in the at least one data storage device, the at least one text string in association with the at least a portion of text from the at least one document.

Clause 11: The method of any of clauses 1-10, wherein storing the at least one text string in association with the text of the at least one document comprises inserting the at least one text string into the text of the at least one document based on a position of the at least one image in the at least one document.

Clause 12: The method of any of clauses 1-11, wherein extracting the at least one image from the at least one document comprises detecting the at least one image in the at least one document, and wherein generating the at least one text string comprises: applying optical character recognition to the at least one image to identify at least one text label string within the at least one image; and combining the at least one text string with the at least one text label string.

Clause 13: A system comprising: at least one computing device configured to: receive a request through an interface of a product; automatically retrieve, based on the request, at least one data element from a data storage device, the at least one data element comprising first text including at least a portion of at least one text string generated from at least one image arranged in at least one document associated with the product, and second text including at least a portion of text from the at least one document; and generate a response to the request based on the at least one data element.

Clause 14: The system of clause 13, wherein the product comprises at least one of the following: home appliances, industrial equipment, medical devices, mechanical systems, robotic systems, in-vehicle systems, or any combination thereof.

Clause 15: The system of any of clauses 13-14, wherein the at least one document comprises a manual for the product, and wherein the at least one image comprises a diagram of at least a portion of the product.

Clause 16: The system of any of clauses 13-15, wherein the at least one computing device is further configured to: generate a plurality of embeddings based on the text and the at least one text string, wherein the plurality of embeddings are stored in the at least one data storage device in association with the text and the at least one text string; in response to receiving the request, generate at least one embedding based on the request; and search the plurality of embeddings based on the at least one embedding to identify the at least one data element.

Clause 17: The system of any of clauses 13-16, wherein the at least one computing device is further configured to: in response to receiving the request, classify the request based on a plurality of categories, wherein the at least one data element is retrieved from the data storage device in response to the request being classified as a first category of the plurality of categories.

Clause 18: The system of any of clauses 13-17, wherein the product comprises a vehicle, and wherein the at least one computing device is further configured to: receive a second request through the vehicle; in response to receiving the second request, classify the second request based on a plurality of categories comprising at least a product manual category and a navigation category; in response to classifying the second request as a navigation request, extract navigation parameters from the second request; generate a navigation message based on the navigation parameters; and communicate the navigation message to a navigation system arranged onboard the vehicle.

Clause 19: The system of any of clauses 13-18, wherein the at least one computing device is further configured to: receive a second request through the product; in response to receiving the second request, classify the second request based on a plurality of categories comprising at least a product manual category and a product system category; in response to classifying the second request as a product system request, extract product system parameters from the second request; generate a product system message based on the product system parameters; and communicate the product system message to a control system for the product.

Clause 20: The system of any of clauses 13-19, wherein generating the response to the request comprises: determining the at least one data element is missing context, wherein the response comprises a refusal message.

Clause 21: The system of any of clauses 13-20, wherein generating the response to the request comprises: generating an inference request based on the request and the at least one data element; inputting the inference request into a machine-learning model, resulting in an initial response; determining that a confidence score of the initial response does not satisfy a threshold; and in response to determining that the confidence score does not satisfy the threshold, generating the refusal message.

Clause 22: The system of any of clauses 13-21, wherein the at least one computing device is further configured to: extract the at least one image from the at least one document; generate, with a machine-learning model, the at least one text string based on the at least one image; and store, in the at least one data storage device, the at least one text string in association with the at least a portion of text from the at least one document.

Clause 23: The system of any of clauses 13-22, wherein storing the at least one text string in association with the text of the at least one document comprises inserting the at least one text string into the text of the at least one document based on a position of the at least one image in the at least one document.

Clause 24: The system of any of clauses 13-23, wherein extracting the at least one image from the at least one document comprises detecting the at least one image in the at least one document, and wherein generating the at least one text string comprises: applying optical character recognition to the at least one image to identify at least one text label string within the at least one image; and combining the at least one text string with the at least one text label string.

Clause 25: A computer program product comprising at least one non-transitory computer-readable medium including program instructions that, when executed by at least one computing device, cause the at least one computing device to: receive a request through an interface of a product; automatically retrieve, based on the request, at least one data element from a data storage device, the at least one data element comprising first text including at least a portion of at least one text string generated from at least one image arranged in at least one document associated with the product, and second text including at least a portion of text from the at least one document; and generate a response to the request based on the at least one data element.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

BRIEF DESCRIPTION OF THE DRAWINGS

Additional advantages and details are explained in greater detail below with reference to the non-limiting, exemplary embodiments that are illustrated in the accompanying schematic figures, in which.

DESCRIPTION

Figure 1:
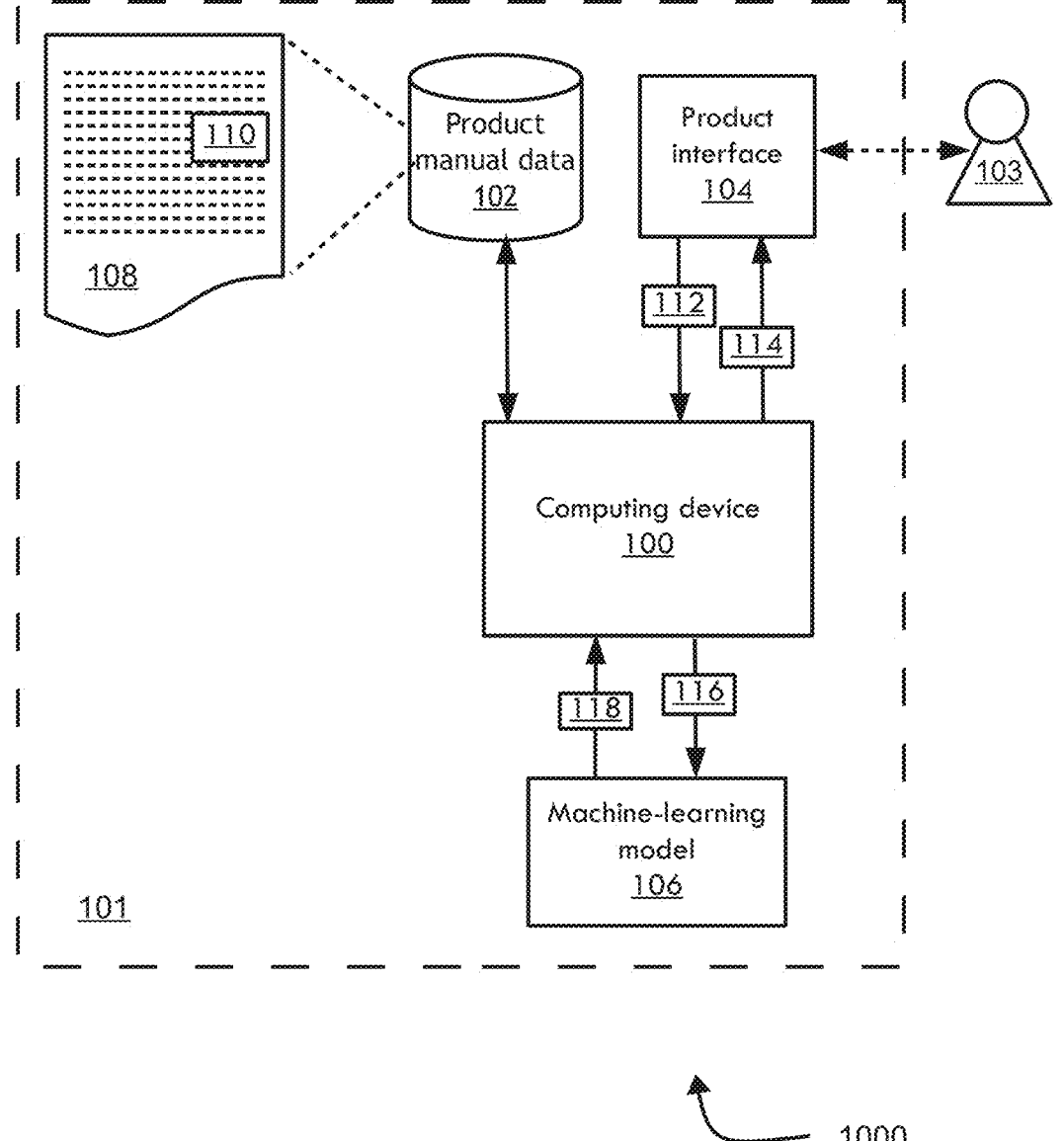
FIG. 1 illustrates a schematic diagram of a system for RAG-based product assistance according to non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the term "computing device" may refer to one or more devices configured to process data. A computing device may include one or more processors, such as Central Processing Units (CPUs), Graphics Processing Units (GPUs), microcontrollers, integrated circuits, field-programmable gate arrays (FPGAs), and/or the like. A computing device may, in some examples, include components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer, server computer, or other form of non-mobile computer. In some non-limiting embodiments, a computing device may include a biological or quantum processing device.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, mobile devices, etc.) directly or indirectly communicating in the network environment may constitute a "system." Reference to "a server," "a processor," or "a computing device," as used herein, may refer to a previously recited server, processor, and/or computing device that is recited as performing a previous step or function, a different server, processor, or computing device, and/or a combination of computing devices. For example, as used in the specification and the claims, a first computing device, a first server, and/or a first processor that is recited as performing a first step or function may refer to the same or different computing device, server, and/or processor recited as performing a second step or function.

Provided herein are systems, methods, and computer program products for. By pre-processing product manual documents to detect images and generate text based on the images, additional textual context is provided to the original text of the product manual documents to enhance a search for relevant data elements. This enhanced search functionality allows for fewer results to be retrieved for subsequent filtering or processing, improving the efficiency of the system. In non-limiting embodiments, the retrieval process allows for smaller contextual payloads to be injected into a machine-learning model to generate a response, preserving resources and improving model efficiency. Further, by strategically using calls to language models, such as small language models (SMLs) and/or LLMs, non-limiting embodiments reduce the amount of computing resources that would be expended with serial LLM calls. Non-limiting embodiments provide product assistance with RAG in a real-time manner (e.g., while a user is interacting with a product) through on-device functionality (e.g., at least partially executed by one or more computing devices internal to the product). Other technical benefits and advantages will be apparent to those skilled in the art.

Referring now to FIG. 1, a system 1000 for RAG-based product assistance is shown according to non-limiting embodiments. The system 1000 includes a computing device 100 configured to execute one or more software applications. The computing device 100 may be part of a product 101. For example, the computing device 100 may be a processor arranged within and dedicated to a product 101, and the processor may include firmware stored thereon for operating and controlling the product. In some examples, the computing device 100 may be external to the product 101 and in communication with one or more computing devices arranged in the product (e.g., such as a mobile computing device in communication with a processor internal to the product 101). As used herein, the term "product" refers to one or more special-purpose devices configured for one or more applications. For example, a product may include industrial equipment, home appliances, medical devices, mechanical systems, robotic systems, in-vehicle systems, or any combination thereof.

Home appliances may include, for example, refrigerators, televisions, heating systems, cooling systems, thermostats, washing machines, dryer machines, smoke detectors, camera systems, power tools, vacuum cleaners, ovens, ranges, grills, smokers, slow cookers, dishwashers, coffee makers, microwaves, air purifiers, water heaters, lighting systems, doorbells, and/or other like devices controlled by one or more computing devices. Industrial equipment may include, for example, 3D printers, CNC machines, drill presses, laser cutters, conveyor systems, and/or the like. Medical devices may include, for example, pumps, MRI machines, ultrasound scanners, heartrate and blood pressure monitors, and/or the like. Mechanical systems may include, for example, building automation systems, utility meters, and/or the like. Robotic systems may include, for example, lawn mowers, assembly line robots, vacuum cleaners, and/or the like. In-vehicle systems may include, for example, onboard vehicle computers, dashboard media systems, navigation systems, vehicle control systems (lights, wipers, climate control, seat adjustments, door locks), and/or the like.

With continued reference to FIG. 1, the system 1000 may include a product manual database 102 including one or more product manual documents 108 associated with the product 101. The product manual documents 108 may include, for example, one or more user manuals (e.g., manuals for assembling or operating the product), warranty manuals, service manuals, subsystem manuals (e.g., navigation or media systems that are part of a vehicle or other product), and/or the like. The product manual database 102 may be physically arranged within the product 101 and/or may be external to the product 101 and in communication with the computing device 100 through one or more network connections. The product manual database 102 may be generated by processing the product manual documents 108. For example, the product manual documents 108 may be processed by scanning the documents to identify one or more images 110 within the product manual documents 108. The images 110 may include, for example, product diagrams, schematics, exploded component diagrams, pictures of the product being used, process flow charts, icons, interface tools, interface screenshots, and/or other like images found in product manuals to assist a user or service professional with operating, maintaining, diagnosing, and/or repairing the product 101.

After one or more images are identified in the product manual document 108, the images may be extracted and processed into one or more text strings. For example, an image 110 may be extracted from the product manual document 108 and input into a machine-learning model, such as a Vision Language Model (VLM), to generate a text string describing the content of the image with an image-to-text conversion. The image-to-text conversion is not just an extraction of embedded text but the visual content of the image (e.g., objects, actions, relationships, and context). In non-limiting embodiments, the image 110 may also be separately processed by an optical character recognition (OCR) algorithm to identify text that may be embedded in the image 110, such as textual labels, annotations, numerals, captions, legends, and/or the like that are part of the image. The text associated with the image 110 may be stored in the product manual database 102 in association with the full product manual document 108. In some non-limiting embodiments, the text associated with the image 110 may be inserted into the product manual document 108 as text in the same position the image 110 was located with respect to the surrounding text, replacing the image with one or more text strings. In non-limiting embodiments, the product manual database 102 may be generated and configured within the product 101 during manufacturing or assembly of the product and/or may be uploaded to the product 101 via one or more network connections. In some non-limiting embodiments, the product manual database 102 may be downloaded and/or generated by firmware in the product during an initial configuration process for the product and/or at predetermined intervals.

Still referring to FIG. 1, the product 101 may include a product interface 104 to facilitate interaction with a user 103. The product interface 104 may provide selectable options for a user 103 to operate and/or control the product. The product interface 104 may include a graphical user interface (GUI), a physical user interface including buttons and/or other input devices, a network interface to communicate with a GUI on an external device (e.g., such as a mobile computing device), and/or the like. In non-limiting embodiments, the product interface 104 may include a microphone, speaker, camera, touchscreen, and/or other like devices. A user 103 may interact with the product interface 104 to control the product and/or to ask questions about the product. In some non-limiting embodiments, the product interface 104 may be used to engage in conversational dialogue with a user 103 through one or more chatbots.

In non-limiting embodiments, a request 112 received from the user 103 through the product interface 104 may be processed by the computing device 100. The request 112 may be a query, and may be in the form of a question, command, request for information, and/or the like. The computing device may classify the request 112 and, based on the classification, automatically perform one or more processes (e.g., a series of steps in a workflow) associated with the classification. For example, the computing device 100 may determine that the request 112 is a product manual query (e.g., a documentation query for which RAG is used) that seeks information available in the product manual document 108 and/or that can be derived from information available in the product manual document 108. In response to determining that the request 112 is a product manual query, the computing device 100 may retrieve one or more textual data elements from the product manual database 102 based on the request.

As used herein, the term "data element" refers to data representing at least a portion of a document, image, file, and/or the like. For example, a data element may include an entire document (e.g., an entire product manual document 108), a portion (e.g., a chunk or segment, such as a section, sentence, paragraph, page, chapter, and/or the like) of a document, an image file, a video file, an audio file, and/or any other data including information in any format. A "textual data element" may include a data element that only includes text. In non-limiting embodiments, the product manual database 102 may store text such that the returned textual data elements are segments of text (e.g., strings) without any images.

With continued reference to FIG. 1, the computing device 100 may generate an inference request 116 based on the request 112 and the data element(s) retrieved from the product manual database 102. The inference request 116 may be input into a machine-learning model 106, such as an LLM. The machine-learning model 106 may be local to the product 101 (e.g., stored on memory internal to the product 101) and/or may be external to the product 101 and in communication with the computing device 100 via a network connection. The computing device 100 may receive an output 118 from the machine-learning model 106 and, based on the output 118, generate a response 114 that is communicated to the user 103 through the product interface 104. In some non-limiting embodiments, additionally, or alternatively, to generating a response 114 for a user 103, the computing device may generate a command message (not shown in FIG. 1) configured to control one or more aspects of the product 101 as a response to the user request 112.

Although FIG. 1 shows a system 1000 with a product manual database 102, it will be appreciated that non-limiting embodiments described herein may be applied to any type of RAG process and to improve outputs generated by machine-learning models. For example, books, articles, newspapers, webpages, brochures, and/or other like informational resources including a combination of text and images may be processed into text for use in a RAG process.

Figure 2:
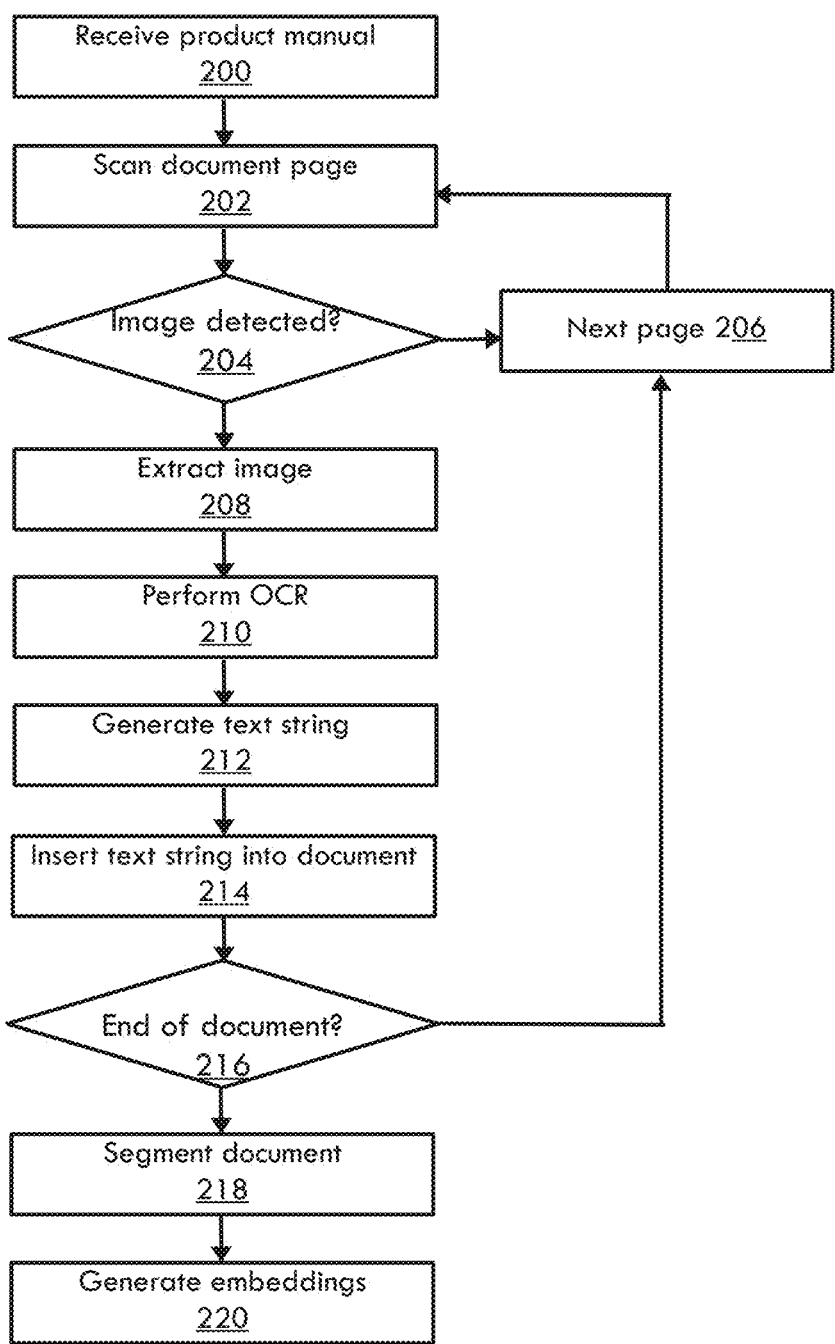
FIG. 2 illustrates a flow diagram for a method for RAG-based product assistance according to non-limiting embodiments or aspects.

Referring now to FIG. 2, a flow chart is shown for RAG-based product assistance according to non-limiting embodiments. The steps shown in FIG. 2 are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step). The steps shown in FIG. 2 may be performed by one or more computing devices, such as computing device 100 shown in FIG. 1.

At step 200, a product manual may be received. In some non-limiting embodiments, a product manual document may be automatically retrieved from an online resource (e.g., a webpage or API-based data service of a manufacturer), automatically retrieved from memory of a product, manually uploaded, and/or the like. In some non-limiting embodiments, product manual documents may be pre-stored on internal memory of the product.

At step 202, the product manual document may be scanned to extract text and image artifacts. For example, a parsing engine may be used to parse the product manual document to extract the text. The text may be extracted while retaining the logical structure of the document by identifying headers, footers, page numbers, and/or other like content to be excluded from the stream of extracted text, reducing noise. In some non-limiting embodiments, the scanning process may preserve the reading order in multi-column or other like layouts. In some non-limiting embodiments, the extracted text may be serialized into a raw string format and stored in association with metadata that includes an identifier of the source document (e.g., a source document identifier that identifies a product manual from different documents, different product manuals for different products or versions of the same product, different versions of product manuals, and/or the like) to be used for referencing and/or identifying the source document during a RAG process and/or generating a final response.

At step 204, while scanning the document at step 202 it may be determined if an image is detected. The scanning process may continue to step 206 and repeat with a next page, section, document, and/or the like. If an image is detected, the method may proceed to step 208 for processing. Although FIG. 2 shows a page-by-page scanning process that processes each image as it is encountered with the text, it will be appreciated that in other non-limiting embodiments, the images may be processed in batches after scanning some or all of the product manual document(s). In some non-limiting embodiments, images may be detected while scanning the document by identifying non-text objects (e.g., visual regions) through, for example, detecting bounding boxes for raster images and vector graphics that are embedded in the document. It will be appreciated that images within the product manual document may be identified with various techniques.

At step 208, the detected image may be extracted from the document. In some examples, non-text artifacts may be filtered and removed from the document to reduce noise before, during, or after image extraction, such as decorative elements, page borders, and/or the like, using dimension thresholds and/or object recognition algorithms, as an example. In some non-limiting embodiments, all non-text artifacts in the document may be detected and then filtered for artifacts that are not part of a substantive image, leaving only image objects as non-text artifacts. The detected image objects, after being validated and/or filtered, may be cropped and stored as standalone image files, such as a bitmap or vector image.

At step 210, an OCR process may be performed on the image by applying one or more OCR algorithms. The OCR process may capture textual labels, annotations, numerals, captions, legends, and/or the like that are part of the image (e.g., part of a bitmap or vector image and not selectable). The resulting text may include labels such as "FIG. 1", "A: Fuse Box," "B: Battery Terminal," button labels (e.g., "on" or "off"), and/or other like text. In some examples the text resulting from the OCR process may be stored as metadata with the image. The resulting text may also be annotated in some examples to indicate that it was extracted from an image (e.g., "[OCR Text]" or the like).

At step 212, one or more text strings may be generated based on the image. In non-limiting embodiments, a machine-learning model may be used to generate text describing the image. For example, a system prompt may instruct a VLM to generate descriptive text for the image based on diagram components, icons, lights, shapes, colors, symbols, alphanumeric indicators, and/or other elements that may correspond to text within the document and/or within the image. The machine-learning model may be configured to encode the image features into one or more embeddings and then to decode the embeddings into a natural language output. As an example, the model may detect the geometry of a "check engine" light or other like icon and output a visual description (e.g., an explanation point, a triangle, and/or the like) that may be used to match with the text of the document. As another example, the model may be configured to identify that a certain symbol in an image is the airbag warning light or locate which button is the window switch in a door panel diagram. For an airbag warning light, a textual description may be added to a label (e.g. "<Airbag warning light icon>—a red figure in the shape of a seated passenger with a circle, indicating airbag status"). The machine-learning model may include any text generated at step 210 and/or the surrounding text as context in some examples. The resulting text may also be annotated to indicate that it came from an image (e.g., "[Visual Description]"). For example, the text may be stored as "[Visual Description]: An amber dashboard indicator light depicting the outline of an engine block" or "[Visual Description]: An air filter being inserted into the side of a furnace." In some examples in which step 210 is performed and results in a text string, the text from step 210 may be appended to the text from step 212 (e.g., "[Visual Description]: An amber dashboard indicator light depicting the outline of an engine block. [OCR Text]: CHECK.").

At step 214, the text resulting from steps 210 and 212 may be inserted into the product manual document and/or used to create a new data structure with all the original text from the product manual document and the text extracted and/or generated from images within the product manual document. For example, the text for each image may be arranged in an array (e.g., a long string) of text in a position where the corresponding image was located with respect to the surrounding text, replacing the image with one or more text strings and preserving the narrative flow of the document.

In non-limiting embodiments, steps 202 through 214 may be performed until the entire document or multiple documents are processed. The result of these steps may be one string of text for the entire document or strings of text for each page or section of the document, as examples. In non-limiting embodiments, the resulting text may be formatted as a unified textual stream containing both extracted text and generated visual descriptions. In non-limiting embodiments in which the document is scanned and processed in a stream without adherence to page numbers, step 206 may not be performed, and the process may start at the beginning of the document and continue until the end of the document, processing each image as it is encountered or as a batch after processing.

Once the end of the document is reached at step 216, the method may proceed to step 218 and the extracted text may be segmented. For example, the string of text may be segmented into textual chunks based on the size of the context window of an embedding model used at step 220 and/or a machine-learning model used later to generate a response to a request. In non-limiting embodiments, the text may be segmented based on a sliding window of characters (e.g., 2,000 characters or the like). The size of the segments may be selected to balance context precision (e.g., small enough to be specific to a single topic) with context completeness (e.g., large enough to contain a full explanation without truncating sentences). In some non-limiting embodiments, a sliding window overlap of characters (e.g., 200 characters or the like) may be enforced between consecutive segments so that information is not lost in a gap between the consecutive segments. In some non-limiting embodiments, additionally, or alternatively, to using a sliding window overlap, a soft splitting logic may be applied to segment the text based on delimiters within the text (e.g., paragraph breaks, page breaks, carriage returns, sentence endings, and/or the like) rather than segmenting mid-word or mid-sentence, preserving the syntactic integrity of the text. It will be appreciated that the text may be segmented in various ways.

At step 220, the segments (e.g., chunks) resulting from step 218 may each be used to generate one or more embeddings. The embeddings may represent the semantic meaning of the segment as a high-dimensional vector. The segments may be input into one or more embedding models and/or embedding layers of a model to generate a high-dimensional embedding (e.g., 1024 dimensions) of each segment. Before being input into an embedding model, the segments may be normalized to provide consistency among embeddings, including removing whitespace and/or the like. In some examples, to optimize throughput, segments may be grouped into batches for generating embeddings. In non-limiting embodiments, the embedding model may map semantic features of the text into the vector space to enable efficient searching and retrieval. For example, a segment that mentions "tire pressure adjustment" may result in a vector that is close in distance to vectors generated for "how to inflate tires," a segment that mentions "hazard lights" may result in a vector that is close in distance to vectors generated for "emergency signal," and/or the like, even though the segments include different keywords.

The embeddings generated at step 220 may be stored in a vector database where each entry in the database is an object including a unique identifier (e.g., a UUID or deterministic hash of the content, as examples), a vector, and associated metadata. In non-limiting embodiments, the metadata may include an object, such as a JavaScript Object Notation (JSON) object, including the original raw text of the segment, the source document identifier and/or filename, and a page, chapter, or section number. In non-limiting embodiments, the database may be configured to generate an HNSW (Hierarchical Navigable Small World) index to permit approximate nearest neighbor (ANN) searches with logarithmic complexity (e.g., O(log N)), enabling ultra-low latency retrieval at a millisecond scale, even as the dataset grows to thousands of segments. The vector database may be optimized for cosine similarity calculations to determine the distance between vectors during a search.

Referring again to FIG. 1, in some non-limiting embodiments, the request 112 received from the user 103 may not require any data elements from the product manual database 102. For example, the request 112 may be in the form of a command to "turn on," "turn off," "increase the temperature," and/or the like. In such examples, the computing device 100 may classify the request 112 in a manner that results in controlling the product 101 and/or returning a response 114 that does not require document retrieval. In non-limiting embodiments, the computing device 100 may implement an orchestrator that acts as a semantic router to direct the user request to a specific tool and cause for the request to be processed. As used herein, the term "tool" may refer to software, hardware, or a combination of software and hardware for performing one or more operations with respect to the product. A tool may include, for example, a product control system, a product subsystem, a function of a control system or subsystem, an application, and/or the like. For example, if the product is a vehicle, a tool may include a climate system, a lighting system, a media system, a dashboard system, a navigation system, and/or the like.

Figure 3:
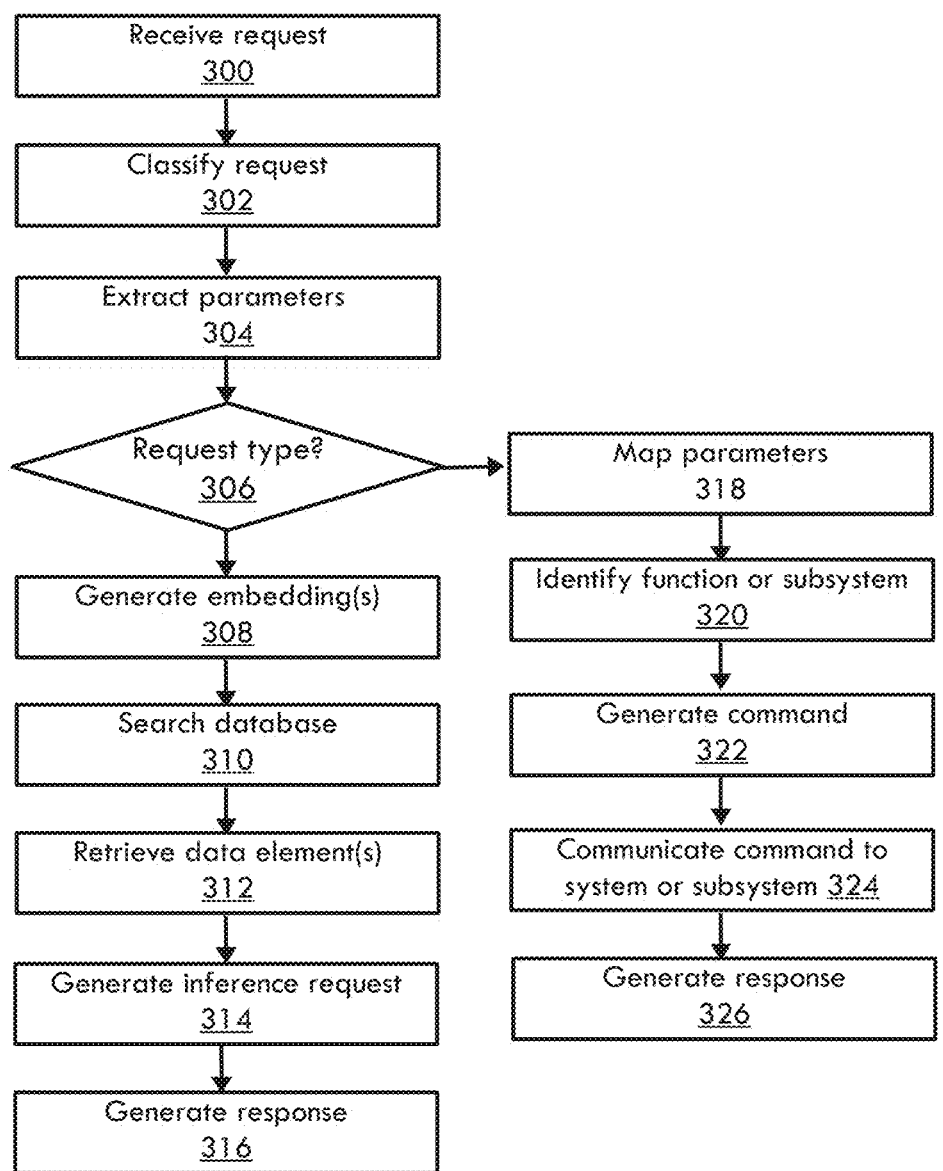
FIG. 3 illustrates a further flow diagram for a method for RAG-based product assistance according to non-limiting embodiments or aspects.

Referring now to FIG. 3, a flow chart is shown for a method of RAG-based product assistance according to non-limiting embodiments. The steps shown in FIG. 3 are for example purposes only. It will be appreciated that non-limiting embodiments may involve additional steps, fewer steps, different steps, and/or a different order of steps. In some non-limiting embodiments or aspects, a step may be performed automatically in response to the completion of a previous step (e.g., may be performed without user intervention upon the completion of a previous step). The steps shown in FIG. 3 may be performed by one or more computing devices, such as computing device 100 shown in FIG. 1.

At step 300, the request may be received from the user through a product interface, such as a GUI, microphone (e.g., voice input for speech-to-text), physical interface, and/or the like. The request may be normalized by removing whitespace, fixing errors and encoding issues, and/or other like operations to provide for consistent embeddings. In some non-limiting embodiments, the request may be modified to include context from one or more prior requests and/or responses. For example, if the request is "turn it off," the context of prior requests may indicate that "it" refers to a lighting system or other like product because a prior request was to "turn on the light" or "dim the light." The context may include the prior request and response or multiple prior requests and responses for a time period (e.g., an hour, day, week, and/or the like), as an example. The context may be added to the request as metadata.

At step 302, the request may be classified. For example, the request may be classified with respect to a plurality of different tools used to generate a response. In non-limiting embodiments, the classification may be performed with a classification model, a language model, or another machine-learning model. The output of the model may be a tool, a category that corresponds to a tool, and/or a prediction score for each tool or category of multiple tools or categories. In non-limiting embodiments, the model may be configured and/or prompted to return a tool from a predetermined list of tools. For example, different protocols (e.g., parameter schemas) may be identified for each tool and injected into the context window of an inference request to the model. The model may evaluate the semantic intent of the request with the list of tools as context and output a probability of the request corresponding to a latent space representation for each tool. In non-limiting embodiments, the machine-learning model used to classify the request may be trained with a high-quality, noise-free dataset that clearly maps user queries to specific system tools. The dataset may be curated to include data that is meant to address ambiguities. For example, an automated ambiguity analysis process may be used to formulate the dataset.

In non-limiting embodiments, the tools may include a product manual tool or a product tool. A product tool may be a tool that interacts with and/or controls hardware or software of the product or a subsystem thereof. In an example in which the product is a vehicle, the product manual tool may be used to respond to questions about engine oil, tire pressure, operating the climate system, or other like topics documented in the product manual, and the product tool may include tools that interact with vehicle hardware such as the vehicle diagnostic system, the vehicle climate control system, powered windows, dashboard displays, headlights, a navigation subsystem (e.g., an onboard navigation system of a vehicle or a navigation system on a connected mobile device), an automatic pilot subsystem, a media system, and/or the like. In some examples, the classification may return an unclassified or miscellaneous category, where none of the predefined tools match. For unclassified or miscellaneous categories, the system may engage in a general chatbot-based conversation, classifying each follow-up response or request from the user until a specific tool is triggered. In some non-limiting embodiments, the classification may be binary as a product manual request (requiring documentary data) or a product request (requiring operation of the product or subsystem thereof).

At step 304, one or more parameters may be extracted from the request. In some non-limiting embodiments, step 304 may be performed as a single step with step 302, such that the extraction of parameters by a model serves as and/or influences the classification. In some non-limiting embodiments, the parameters may be extracted as a structured object, rather than natural language, such as a JSON object including parameters conforming to a protocol for a tool corresponding to the request. For example, a simple request such as "Help" or "help me with my product" may output a JSON object of: {"tool": "user_manual", "request": "Help"}. This object identifies the tool as "user_manual", indicating that the request was classified as a product manual request that may be answerable with information from a product manual, and includes the plaintext of the request. As another example, if the intent contains variables (e.g., "Set temperature to 21 degrees"), the model may extract these entities into an object as follows: {"tool": "product_related", "action": "set_climate", "value": 21, "unit": "celsius"}. This object indicates that the request was classified as a product tool request and can be used to automatically control a climate system.

At step 306, the request may be routed to different tools and associated workflows based on the classification. In some non-limiting embodiments, the tool identified in the structured object generated at step 304 may be used as the classification to determine the routing. For example, the "tool" key of the object may be used as a control signal to deterministically branch the execution of the workflow to a different tool. This classification and routing process may prevent "mixed mode" hallucinations where the model may try to respond to a request with the wrong tool.

If the request is classified as a product manual request, the method may proceed to step 308 to commence a RAG process to generate a response to the request. At step 308, one or more embeddings may be generated based on the request. For example, the raw user request may be processed with an embedding model (e.g., such as the embedding model used at step 220 of FIG. 2) to generate an embedding represented as a vector in the same latent space as the vectorized product manual segments. The embedding may include a large number of dimensions (e.g., 1024).

At step 310, a product manual database may be searched based on the embedding(s) generated at step 308. For example, a nearest neighbor search may be performed by traversing the HNSW index of the database using cosine similarity as the distance metric. It will be appreciated that any clustering and/or vector distance algorithm may be used in non-limiting embodiments. The search process may return a predetermined number of data elements (e.g., ten) with the highest similarity scores (e.g., shortest distances to the vector generated at step 308). The data elements may each include a segment from the product manual, including original text and/or text generated from one or more images in the product manual.

In non-limiting embodiments, the search results are first ranked based on vector distance and then re-ranked to refine the context. For example, the top predetermined number of data elements (e.g., ten) and the original user request may be paired and input into a cross-encoder model configured to process the pair together, allowing for deep attention inter-actions between query tokens and document tokens. The search results may then be re-ranked based on a semantic relevance score of each data element output from the cross-encoding model. A top predetermined number of the re-ranked results may then be identified (e.g., five), such that the predetermined number of re-ranked results is less than the predetermined number of results initially returned (e.g., ten).

At step 312, the top predetermined number of ranked search results (e.g., five) may be retrieved from data storage and stored in temporary memory for use. At step 314, an inference request may be generated for a machine-learning model to generate a response to the request. In non-limiting embodiments, the text (e.g., original, raw text of the request) may be extracted from each data element (e.g., from a structured data object including the original text with meta-data). The extracted text from all the retrieved data elements may be combined by concatenating the strings together into a single context block. In some non-limiting embodiments, source identifiers (e.g., page numbers, section numbers, chapter numbers, and/or the like) may be retained to allow for the final response to include citations to increase user trust.

In non-limiting embodiments, the inference request may include a prompt and/or the machine-learning model may be instantiated with a system prompt configured to cause the machine-learning model to enforce one or more constraints, such as closed-domain constraints, negative constraints, meta-cognitive suppression, and/or the like. In non-limiting embodiments, a closed-domain constraint may explicitly instruct the model to limit itself to the document context (e.g., "You are not a general assistant. You are a documen-tation-bound interface" or "Only use the attached context to generate the response"), instructing the model against accessing its pre-trained parametric knowledge base as context to generate a response. If the response is not in the provided context, it may be determined to not exist, and the model may be configured to return an error or refusal message rather than a hallucination. Negative constraints may include refusal logic, such as instructing the model to use deterministically fallback with a refusal message (e.g., "I can't help you on this precise point, please refer to the owner manual of the product to get a more detailed response") if enough context is not available to generate a response, thereby preventing the model from guessing or fabricating incorrect procedures. Further, in some non-limiting embodi-ments, for meta-cognitive suppression, the model may be instructed to hide the mechanics of the RAG process. For example, the mode may be instructed to not use terms such as "segments," "chunks," "context," "vector," and/or the like in its final output, providing a natural conversational experience (e.g., rather than "according to chunk 3 . . . ", the output may be "To adjust the seat . . . ").

At step 314 the original request from step 300 and the retrieved context from step 312 may be input into the machine-learning model with the inference request gener-ated at step 314. The model may use its self-attention mechanism to identify specific sentences or segments within the context text that align with the intent of the request. The model may also be prompted and/or configured to interpret image-to-text segments as natural instructions. For example, if the relevant context includes a description of a button with a snowflake icon, the response may be "Press the button marked with a snowflake symbol," using the descriptive term "snowflake" from the text string generated from the image during ingestion of the product manual document(s).

In some non-limiting embodiments, the generated response may be directly provided to the user that made the request. In other non-limiting embodiments, the generated response may be verified to confirm that the response is based on the product manual and not the internal memory of the model. For example, the model may be prompted to return a refusal message from one or more alternative, predetermined responses (e.g., "would you like to search online instead?", "please rephase your request", or the like).

If, at step 306, the request is classified as invoking a product tool (e.g., a tool for the product control system and/or a product subsystem), the method may proceed to step 318 and bypass the RAG process in favor of an API-driven workflow. At step 318, the parameters extracted at step 304 may be mapped to the parameters of the tool identified during classification (e.g., the product tool) to form a structured object. At step 320, one or more functions or subsystems may be identified for the tool identified during classification. For example, Named Entity Recognition (NER) and/or slot filling may be performed on the request to identify one or more systems or subsystems in the request, such as a product control system or product subsystem. In examples where the product is a vehicle, the product may include a vehicle control system, a navigation system, a climate control system, an autopilot subsystem, and/or other like systems or subsystems. In some non-limiting embodi-ments, a machine-learning model such as an SLM or LLM may be used to process the request and map the extracted parameters to the parameters for one or more tools. For example, if a request is "set the temperature to 21 degrees," the model may map linguistic tokens to the parameters defined in the protocol for the tool (e.g., a parameter schema). In this example, "21" may be identified as the value, "degrees" may be identified as the unit, and "set_cli-mate" (e.g., a function name for the climate subsystem) may be identified as the corresponding action.

At step 322, a command may be generated for the function or subsystem identified at step 320. For example, a middleware layer may process the structured object gener-ated at step 318 to translate the high-level intent of the structured object into specific low-level commands that can be interpreted and processed directly by the product and/or subsystem hardware or firmware. For example, the struc-tured object of {"action": "set_climate", "value": 21} may be translated into a hardware-level or firmware-level com-mand that directly controls the climate system of a vehicle or a building cooling system. In non-limiting embodiments, the command may be in the form of a data packet for a Controller Area Network (CAN), such as a bus signal frame, a Representational State Transfer (REST) API request packet, and/or any other predetermined command or request format. In non-limiting embodiments in which the product is a vehicle, the command may be formatted for an Android Automotive OS (AAOS) API endpoint, may be formatted as a CAN packet, and/or the like. In non-limiting embodiments in which the product is a vehicle and the subsystem is identified as a navigation system, a query string or intent object may be generated for the navigation system with parameters including a location, a point of interest, and/or the like.

At step 326, a response may be generated and output. For example, a response may be generated with or communicated through the product interface to inform a user that an action has been performed in response to the request. In non-limiting embodiments, the system may wait for a callback or state change confirmation message (e.g., "Climate Control: Success"). In some non-limiting embodiments, the callback may include a success or failure signal from the product hardware. In some non-limiting embodiments, the result of the action (e.g., success, failure, current state, and/or the like) may be processed with a machine-learning model, such as a lightweight language model (e.g., an SLM or fast LLM), to generate a natural language confirmation for the user (e.g., "I've set the cabin temperature to 21 degrees", "The temperature is set to 21 degrees", and/or the like). In examples in which the product is a vehicle, the response may be output to a media system, such as an infotainment system, of the vehicle. In some non-limiting embodiments, the response may be provided through a connected device, such as a connected mobile computing device, smart home hub, speaker, monitor, and/or the like.

Figure 4:
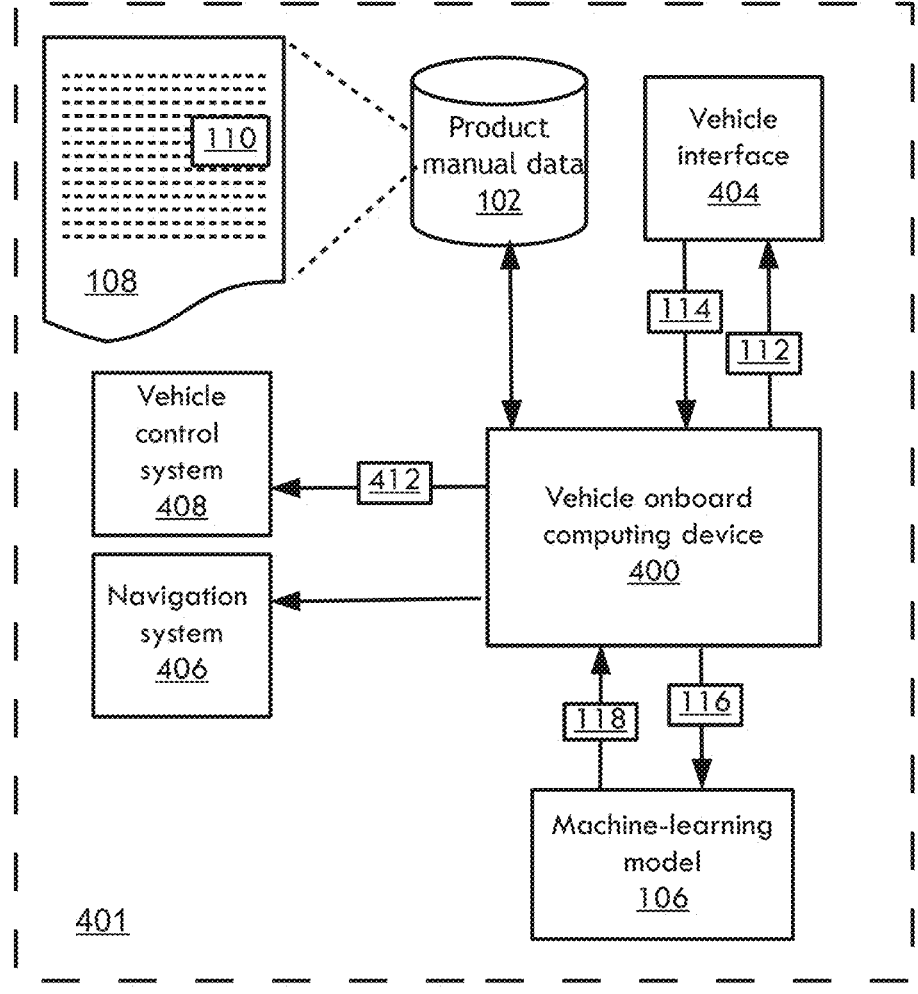
FIG. 4 illustrates a schematic diagram of a vehicle system for RAG-based product assistance according to non-limiting embodiments or aspects.

Referring now to FIG. 4, a vehicle system 4000 for RAG-based product assistance is shown according to non-limiting embodiments. The vehicle system 4000 includes a vehicle 401 as the product and a vehicle onboard computing device 400 configured to control one or more aspects of the vehicle 401. Items 102, 106, 108, 110, 112, 114, 116, and 118 may be as described in connection with FIG. 1. The vehicle onboard computing device 400 may be configured as the computing device 100 in FIG. 1. The vehicle interface 404 may include an infotainment system, a dashboard display, and/or the like. The vehicle system 4000 may include a vehicle control system 408 and a vehicle navigation system 406. In some non-limiting embodiments, the vehicle onboard computing device 400 may generate and output a command message 412 to the vehicle control system 408 or navigation system 406. The command system may cause a tool of a vehicle subsystem to take an action, such as turning on lights, adjusting the temperature, locking the doors, operating the windows, opening the hood, and/or the like.

In non-limiting embodiments, the system may be evaluated with one or more "golden" datasets with ground truth data for testing and training. For example, retrieval metrics may be determined for the documents retrieved during the RAG process (e.g., step 312 of FIG. 3) to determine if the system identified the correct portion of the product manual. A retrieval metric may include recall, which may be determined in some non-limiting embodiments to measure the binary presence of a ground-truth segment (e.g., from a "golden" dataset used for testing) within the top K results returned by the system. Recall may be determined for each of the top predetermined number of results (e.g., five) to evaluate whether the ranking algorithm is accurate. In some non-limiting embodiments, an average position (e.g., mean rank) may be determined as the average ranking position of the ground-truth segment across all test queries. If the mean rank value drifts higher than 1 (e.g., 4.5), it may indicate a degradation in the ability of the embedding model to discriminate relevance and may be an early warning signal for ranking drift.

In non-limiting embodiments, a training corpus may be generated using a large "Teacher Model" (e.g., a high-capacity LLM) to synthetically generate numerous (e.g., thousands) of diverse user requests based on the descriptions of the available tools. For example, a prompt may instruct the model to vary linguistic style, length, and specificity to mimic real-world usage and differences. Each generated request may be tagged with the tool it was generated for. To verify the quality of these synthetic labels, the system may process every generated question with a rigorous cross-examination process using a similarity evaluation algorithm. For example, for each question in the dataset, the system may generate an independent inference request to the Teacher Model. Through a prompt, the model may be presented with the definitions of all available tools and asked to rate the suitability of each tool for the given question on a discrete scale (e.g., 0: Not suitable; 1: Potentially suitable (ambiguous/partial fit); 2: Very suitable (perfect fit)). The result may be a score vector for each question, e.g., {user-_manual: 2, vehicle_related: 1, navigation: 0, other: 0}. The system may analyze the score vectors to categorize the data quality. For example, if a question receives a score of >0 for more than one tool (e.g., {user_manual: 2, vehicle_related: 2}), it may be flagged as ambiguous. The generated requests may be filtered to identify "golden" requests, which may be defined based on score. For example, "golden" requests may include samples where the target tool receives a score of 2 and all other tools receive a score of 0. For the request "Navigate to the nearest gas station", the scores may be: {navigation: 2, manual: 0, vehicle: 0, other: 0} and the request may be stored with other "golden" requests that are retained for the final fine-tuning of the model.

Figure 5:
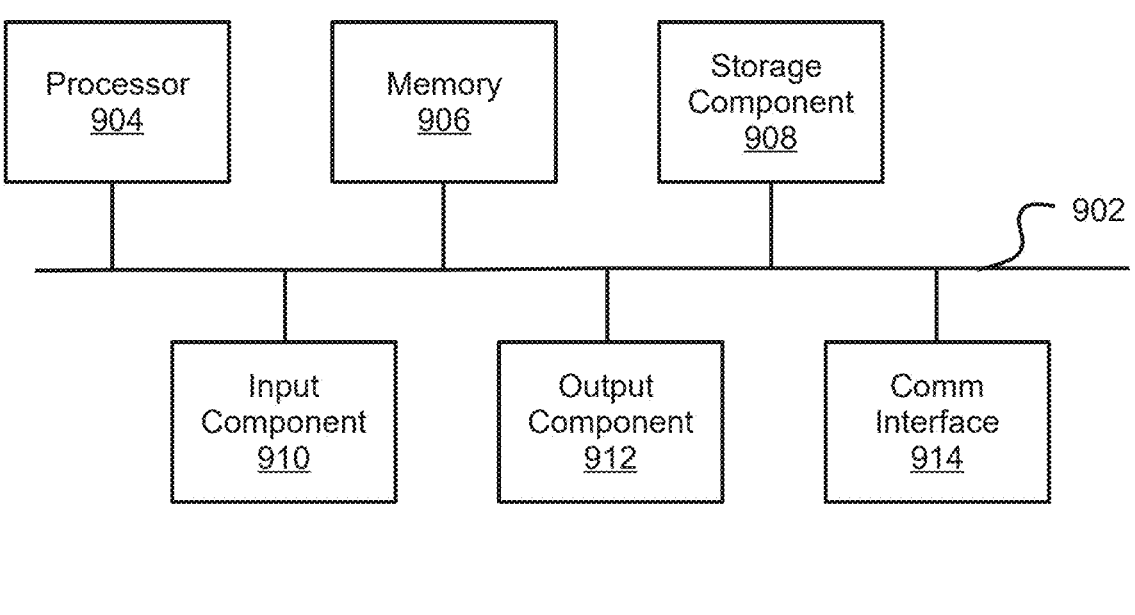
FIG. 5 illustrates example components of a device used in connection with non-limiting embodiments or aspects of systems, methods, and computer program products for RAG-based product assistance.

Referring now to FIG. 5, shown is a diagram of example components of a computing device 900 for implementing and performing the systems and methods described herein according to non-limiting embodiments. In some non-limiting embodiments, device 900 may include additional components, fewer components, different components, or differently arranged components than those shown in FIG. 5. Device 900 may correspond to the computing device 100 shown in FIG. 1. Device 900 may include a bus 902, a processor 904, memory 906, a storage component 908, an input component 910, an output component 912, and a communication interface 914. Bus 902 may include a component that permits communication among the components of device 900. In some non-limiting embodiments, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed or configured to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 5, storage component 908 may store information and/or software related to the operation and use of device 900. For example, storage component 908 may include a hard disk (e.g., a magnetic disk, an optical disk, a magneto-optic disk, a solid-state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect.

What is claimed is:

1. A method comprising:

receiving a request through an interface of a product;

classifying the request as a product manual category based on a plurality of categories comprising at least the product manual category and a product system category;

based on classifying the request as the product manual category, initiating a retrieval-augmented generation (RAG) process by automatically retrieving, with at least one computing device and based on the request, at least one data element from a data storage device, the at least one data element comprising first text including at least a portion of at least one text string generated from at least one image arranged in at least one document associated with the product, and second text including at least a portion of text from the at least one document;

generating, with at least one computing device, a response to the request based on the at least one data element;

receiving a second request through the interface of the product;

classifying the second request as the product system category based on the plurality of categories;

based on classifying the second request as the product system category, bypassing the RAG process;

extracting product system parameters from the second request;

mapping the product system parameters to at least one tool; and automatically controlling the product with the at least one tool based on the product system parameters.

2. The method of claim 1, wherein the product comprises at least one of the following: home appliances, industrial equipment, medical devices, mechanical systems, robotic systems, in-vehicle systems, or any combination thereof.

3. The method of claim 1, wherein the at least one document comprises a manual for the product, and wherein the at least one image comprises a diagram of at least a portion of the product.

4. The method of claim 1, further comprising:

generating a plurality of embeddings based on the text and the at least one text string, wherein the plurality of embeddings are stored in the at least one data storage device in association with the text and the at least one text string;

in response to receiving the request, generating at least one embedding based on the request; and searching the plurality of embeddings based on the at least one embedding to identify the at least one data element.

5. The method of claim 1, further comprising:

in response to receiving the request, classifying the request based on a plurality of categories, wherein the at least one data element is retrieved from the data storage device in response to the request being classified as a first category of the plurality of categories.

6. The method of claim 1, wherein the product comprises a vehicle, the method further comprising:

receiving a second request through the vehicle;

in response to receiving the second request, classifying the second request based on a plurality of categories comprising at least a product manual category and a navigation category;

in response to classifying the second request as a navigation request, extracting navigation parameters from the second request;

generating a navigation message based on the navigation parameters; and communicating the navigation message to a navigation system arranged onboard the vehicle.

7. The method of claim 1, wherein the at least one tool is identified based on a classification of the second request, further comprising:

forming a structured object based on the product system parameters extracted from the second request; and translating the structured object into at least one command, the at least one command configured to be processed by at least one of firmware and hardware of the product, wherein the product is controlled with the at least one tool and the at least one command.

8. The method of claim 1, wherein generating the response to the request comprises:

determining the at least one data element is missing context, wherein the response comprises a refusal message.

9. The method of claim 8, wherein generating the response to the request further comprises:

generating an inference request based on the request and the at least one data element;

inputting the inference request into a machine-learning model, resulting in an initial response;

determining that a confidence score of the initial response does not satisfy a threshold; and in response to determining that the confidence score does not satisfy the threshold, generating the refusal message.

10. The method of claim 1, further comprising:

extracting the at least one image from the at least one document;

generating, with a machine-learning model, the at least one text string based on the at least one image; and storing, in the at least one data storage device, the at least one text string in association with the at least a portion of text from the at least one document.

11. The method of claim 10, wherein storing the at least one text string in association with the text of the at least one document comprises inserting the at least one text string into the text of the at least one document based on a position of the at least one image in the at least one document.

12. The method of claim 10, wherein extracting the at least one image from the at least one document comprises detecting the at least one image in the at least one document, and wherein generating the at least one text string comprises:

applying optical character recognition to the at least one image to identify at least one text label string within the at least one image; and combining the at least one text string with the at least one text label string.

13. A system comprising:

at least one computing device configured to:

receive a request through an interface of a product;

classify the request as a product manual category based on a plurality of categories comprising at least the product manual category and a product system category;

based on classifying the request as the product manual category, initiate a retrieval-augmented generation (RAG) process by automatically retrieving, based on the request, at least one data element from a data storage device, the at least one data element comprising first text including at least a portion of at least one text string generated from at least one image arranged in at least one document associated with the product, and second text including at least a portion of text from the at least one document;

generate a response to the request based on the at least one data element;

receive a second request through the interface of the product;

classify the second request as the product system category based on the plurality of categories;

based on classifying the second request as the product system category, bypass the RAG process;

extract product system parameters from the second request;

map the product system parameters to at least one tool; and automatically control the product with the at least one tool based on the product system parameters.

14. The system of claim 13, wherein the product comprises at least one of the following: home appliances, industrial equipment, medical devices, mechanical systems, robotic systems, in-vehicle systems, or any combination thereof.

15. The system of claim 13, wherein the at least one document comprises a manual for the product, and wherein the at least one image comprises a diagram of at least a portion of the product.

16. The system of claim 13, wherein the at least one computing device is further configured to:

generate a plurality of embeddings based on the text and the at least one text string, wherein the plurality of embeddings are stored in the at least one data storage device in association with the text and the at least one text string;

in response to receiving the request, generate at least one embedding based on the request; and search the plurality of embeddings based on the at least one embedding to identify the at least one data element.

17. The system of claim 13, wherein the at least one computing device is further configured to:

in response to receiving the request, classify the request based on a plurality of categories, wherein the at least one data element is retrieved from the data storage device in response to the request being classified as a first category of the plurality of categories.

18. The system of claim 13, wherein the product comprises a vehicle, and wherein the at least one computing device is further configured to:

receive a second request through the vehicle;

in response to receiving the second request, classify the second request based on a plurality of categories comprising at least a product manual category and a navigation category;

in response to classifying the second request as a navigation request, extract navigation parameters from the second request;

generate a navigation message based on the navigation parameters; and communicate the navigation message to a navigation system arranged onboard the vehicle.

19. The system of claim 13, wherein the at least one tool is identified based on a classification of the second request, and wherein the at least one computing device is further configured to:

form a structured object based on the product system parameters extracted from the second request; and translate the structured object into at least one command, the at least one command configured to be processed by at least one of firmware and hardware of the product, wherein the product is controlled with the at least one tool and the at least one command.

20. The system of claim 13, wherein generating the response to the request comprises:

determining the at least one data element is missing context, wherein the response comprises a refusal message.

21. The system of claim 20, wherein generating the response to the request comprises:

generating an inference request based on the request and the at least one data element;

inputting the inference request into a machine-learning model, resulting in an initial response;

determining that a confidence score of the initial response does not satisfy a threshold; and in response to determining that the confidence score does not satisfy the threshold, generating the refusal message.

22. The system of claim 13, wherein the at least one computing device is further configured to:

extract the at least one image from the at least one document;

generate, with a machine-learning model, the at least one text string based on the at least one image; and store, in the at least one data storage device, the at least one text string in association with the at least a portion of text from the at least one document.

23. The system of claim 22, wherein storing the at least one text string in association with the text of the at least one document comprises inserting the at least one text string into the text of the at least one document based on a position of the at least one image in the at least one document.

24. The system of claim 22, wherein extracting the at least one image from the at least one document comprises detecting the at least one image in the at least one document, and wherein generating the at least one text string comprises:

applying optical character recognition to the at least one image to identify at least one text label string within the at least one image; and combining the at least one text string with the at least one text label string.

25. A computer program product comprising at least one non-transitory computer-readable medium including program instructions that, when executed by at least one computing device, cause the at least one computing device to:

receive a request through an interface of a product;

classify the request as a product manual category based on a plurality of categories comprising at least the product manual category and a product system category;

based on classifying the request as the product manual category, initiate a retrieval-augmented generation (RAG) process by automatically retrieving, based on the request, at least one data element from a data storage device, the at least one data element comprising first text including at least a portion of at least one text string generated from at least one image arranged in at least one document associated with the product, and second text including at least a portion of text from the at least one document;

generate a response to the request based on the at least one data element;

receive a second request through the interface of the product;

classify the second request as the product system category based on the plurality of categories;

based on classifying the second request as the product system category, bypass the RAG process;

extract product system parameters from the second request;

map the product system parameters to at least one tool; and automatically control the product with the at least one tool based on the product system parameters.

* * * * *